March 1, 1932.  T. J. SCHMITZ  1,847,310
PROCESS OF MANUFACTURING PIPES
Filed Oct. 2, 1930
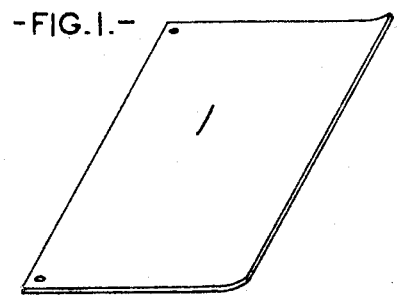
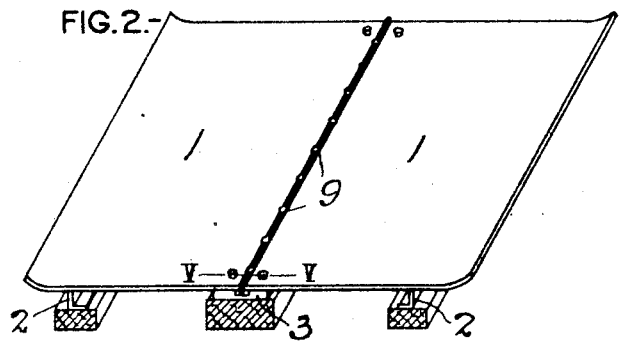
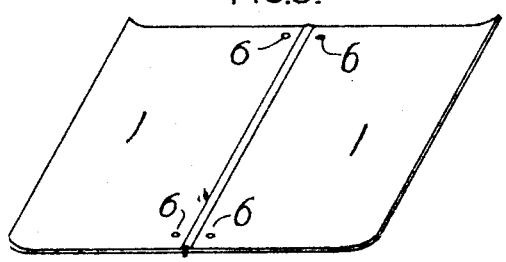
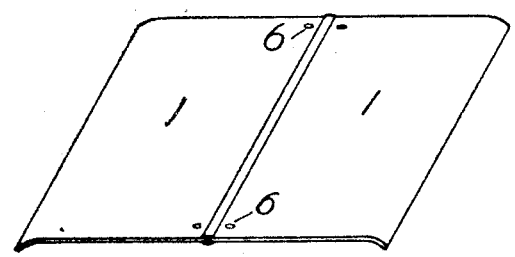
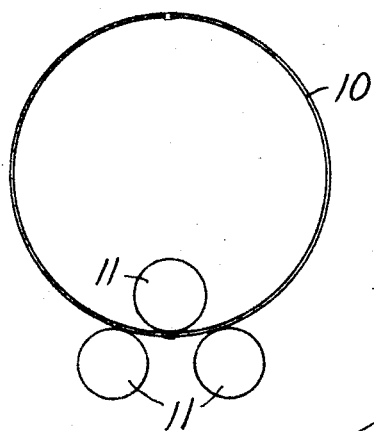
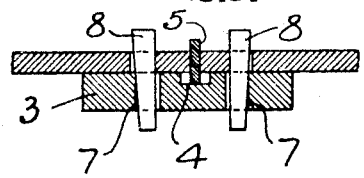
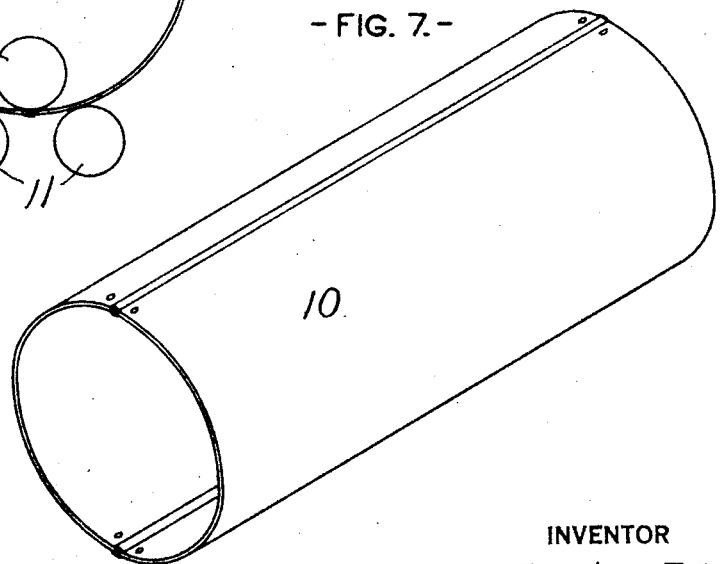
INVENTOR
Theodore J. Schmitz
BY
ATTORNEY Patented Mar. 1, 1932

1,847,310

UNITED STATES PATENT OFFICE

THEODORE J. SCHMITZ, OF DUNKIRK, NEW YORK

PROCESS OF MANUFACTURING PIPES

Application filed October 2, 1930. Serial No. 485,931.

This invention relates to the art of manufacturing pipes, tanks or large cylindrical bodies. The object of the invention is to provide a process of manufacture, which, while effecting a saving in labor over the processes heretofore employed in the making of similar structures, will also produce a superior product.

In the accompanying drawings illustrating the successive operations of the process of the present invention, and in which like reference characters indicate like parts, Fig. 1, is a perspective view of a single plate of metal to be used in the manufacture of a pipe; Fig. 2, is a similar view of a pair of the plates on a setting-up rack; Fig. 3, is a perspective view of a pair of plates with their adjacent edges welded on their inner sides; Fig. 4, shows the parts of Fig. 3, reversed, with the edges welded on the opposite side; Fig. 5, is a section on the line V—V of Fig. 2, showing tapered pins holding the plates firmly together against the welding strip; Fig. 6, is an end view of the welded assembly in cylindrical form, in bending rolls; and Fig. 7, is a perspective view of the completed pipe having the remaining edges welded together.

Referring in detail to the successive operations of the process as illustrated in the drawings, the single plates 1, of metal to be used in the manufacture of a pipe or other hollow article, are first slightly bent or curved, on one edge only; it being necessary to thus shape the same independently of bending rollers, in so much as the necessary space between the rollers used to bend large pipe is too great to effect the ends of the plate.

All of the plates are then laid on a setting-up rack comprising outer supporting members 2, and a central member 3; the central member 3, being provided with a longitudinal slot 4, of substantially the same length as the plates. The plates are laid with their curved edges at the outside and between their inner adjacent edges a welding strip 5, of suitable metal, is placed, extending into the slot 4, and being held thereby in vertical position so as to project equally on each side of the plates. Holes 6 and 7, are provided in the plates, and the rack respectively. The holes are of substantially the same diameter and so positioned as to be directly in line with each other when the plates are in position on the rack without the welding strip between them, so that with the latter inserted between their adjacent edges, the plate holes are slightly to the outside of the rack holes. Tapered pins 8, are then inserted in the holes 6 and 7, and by forcing the same downward, the plates are brought firmly together against the welding strip 5. The welding strip is then "tacked" or hand-welded to the plates at intervals of approximately 12 inches, as indicated by the numeral 9, (Fig. 2) after which the edges of the two plates are completely electrically welded together on the upper side, and then reversed and welded on the opposite side by the same method.

This assembly 10, is then rolled as a single sheet, as shown in Fig. 6, between the bending rollers 11, into cylindrical form, and the final weld of the outer edges is then made to complete the section of pipe.

By the above process of manufacture it is possible to roll the double plate at practically the same cost as a single one. As it is necessary, in this process, to bend or curve only one edge of each plate, and since the cost of welding both edges of the plate after rolling, would be greater than the welding of one edge while the plates are flat and one after they have been rolled, as described, a substantial economy is achieved. It has also been found in practice that by the use of the above process a rounder and superior pipe is produced.

The invention claimed and desired to be secured by Letters Patent is:

1. The process of manufacturing pipe and similar hollow articles which consists in joining a plurality of substantially flat plates, each having a pair of oppositely disposed edges directed to run substantially in a direction lengthwise of the finished hollow article, by placing an edge of each plate opposite an edge of another plate and in the same plane therewith; holding said edges, as thus placed, fixed; welding said edges together forming thereby a substantially flat single sheet having a pair of oppositely disposed edges directed to run substantially lengthwise of the finished hollow article; thereafter bending the sheet into a hollow form with said last mentioned edges adjacent each other; and finally welding the last mentioned edges together.

2. The process of manufacturing pipe and similar hollow articles which consists in joining a plurality of substantially flat plates each having a pair of oppositely disposed edges directed to run substantially in a direction lengthwise of the finished hollow article, by placing an edge of each plate opposite an edge of another plate and in the same plane therewith, with a welding strip therebetween; holding said edges, as thus placed, fixed; welding said edges together forming thereby a substantially flat single sheet having a pair of oppositely disposed edges directed to run substantially lengthwise of the finished hollow article; thereafter bending the sheet into a hollow form with said last mentioned edges adjacent each other; and finally welding the last mentioned edges together.

3. The process of manufacturing pipe and similar hollow articles which consists in joining a plurality of substantially flat plates, each having a pair of oppositely disposed edges directed to run substantially lengthwise of the finished hollow article, by placing an edge of each plate opposite an edge of another plate and in the same plane therewith; holding said edges, as thus placed, fixed; welding said edges together, the outermost plates of said welded assemblage having their outer edges formed slightly bent or curved; thereafter bending the sheet thus formed into a hollow shape with said last mentioned edges adjacent each other; and finally welding the last mentioned edges together.

4. The process of manufacturing pipe and similar hollow articles which consists in curving one edge of each of a pair of flat plates having holes near the opposite edge of the same, placing the plates in juxtaposition on a setting-up rack with the curved edges on the outside, inserting a welding strip of metal between their adjacent inner edges, bringing said edges firmly together against the welding strip by forcing tapered pins through their said holes into adjacent holes formed in the setting-up rack inwardly offset from the said plate holes, tacking the edges of said plates together on their upper sides by welding the same at intervals, alternately welding the edges of the plates completely together on their opposite sides, rolling the assembly as a single unit into hollow form, and finally welding together said curved edges of the plates to complete the section.

5. The process of manufacturing pipe and similar hollow articles which consists in joining a plurality of substantially flat plates each having a pair of oppositely disposed edges directed to run substantially lengthwise of the finished hollow article, by placing an edge of each plate opposite an edge of another plate and in the same plane therewith, with a welding strip therebetween; holding said edges as thus placed under pressure against the welding strip; welding said edges together forming thereby a substantially flat single sheet having a pair of oppositely disposed edges directed to run substantially lengthwise of the finished hollow article; thereafter bending the sheet into a hollow form with said last mentioned edges adjacent each other; and finally welding the last mentioned edges together.

6. The process of manufacturing pipe and similar hollow articles which consists in joining a plurality of substantially flat plates, each having a pair of oppositely disposed edges directed to run substantially lengthwise of the finished hollow article, by placing an edge of each plate opposite an edge of another plate and in the same plane therewith preparatory to forming a joint between the edges; pressing the parts for forming the joint together; welding said edges together, the outermost plates of said welded assemblage having their outer edges slightly bent or curved; thereafter bending the sheet thus formed into a hollow shape with said last mentioned edges adjacent each other; and finally welding the last mentioned edges together.

THEODORE J. SCHMITZ.